United States Patent [19]

Wiedmann

[11] 3,900,838

[45] Aug. 19, 1975

[54] HYBRID STORAGE CIRCUIT

[75] Inventor: Siegfried Kurt Wiedmann, Stuttgart, Germany

[73] Assignee: International Business Machines Corporation, Armonk, N.Y.

[22] Filed: Feb. 25, 1974

[21] Appl. No.: 445,700

[30] Foreign Application Priority Data

Feb. 27, 1973 Germany ............ 2309616

[52] U.S. Cl. ............ 340/173 R; 307/238; 307/279; 307/291; 340/173 FF

[51] Int. Cl. ............ G11c 11/40

[58] Field of Search ............ 340/173 R, 173 FF; 307/238, 279, 291

[56] References Cited

UNITED STATES PATENTS

| | | | |
|---|---|---|---|
| 3,535,699 | 10/1970 | Gaensslen | 307/291 |
| 3,541,530 | 11/1970 | Spampinato | 340/173 R |
| 3,553,541 | 1/1971 | King | 340/173 R |
| 3,617,778 | 7/1968 | Korom | 307/313 |
| 3,731,164 | 5/1973 | Cheney | 340/173 R |

*Primary Examiner*—Terrell W. Fears
*Attorney, Agent, or Firm*—Howard J. Walter, Jr.

[57] ABSTRACT

A semiconductor storage cell operating on the flip flop principle and in which the cross-coupled storage transistors and the load transistors are field effect and bipolar transistors, respectively. The semiconductor cell is a FET storage cell whose active storage transistors are field effect transistors which, in contrast to bipolar transistors, do not have to be isolated against each other, thus occupying a smaller semiconductor area. The bipolar load transistors permit a very low stand-by current on the order of the leakage current to be impressed, which in contrast to FET load elements can be changed to a desirably high operating current during reading. Apart from this, the bipolar transistors in the load branches need not be isolated against each other in this configuration, so that at a low rate of permanent power dissipation, which is roughly comparable to that of CMOS storages, the semiconductor cell area can be further reduced.

16 Claims, 4 Drawing Figures

HYBRID STORAGE CIRCUIT

BACKGROUND OF THE INVENTION

1. Field of the Invention

The invention relates to a low permanent power dissipation semiconductor storage circuit utilizing bipolar and unipolar, i.e., field effect transistors with two cross-coupled transistors as active storage transistors, with the load branches of which one further transistor each is linked, whereby the storage and load transistors are of a different transistor type.

2. Description of the Prior Art

Transistor storage cells are generally combined to form extensive storage arrangements and are preferably employed as memories for computers. When judging various types of storage circuits or arrangements, characteristics such as high speeds, low permanent power dissipation, low semiconductor area requirements, and thus high packing densities, in addition to a simple and uncomplicated manufacturing process, are particularly important.

For static electric storage cell circuits so-called flip flop storage cells with their typical cross-coupling have been gaining ground. Flip flop storage cells in bipolar technology have, it is true, a high switching speed but are not fully satisfactory with regard to the power dissipation produced and the heat problems directly linked therewith. Apart from this, bipolar integrated switching circuits necessitate area-consuming isolation regions which lead to the packing density obtainable being considerably curtailed.

With many of the inherent technological problems having been overcome, alternative flip flop storage concepts with field effect transistor (FETs) offer a relatively high packing density at an essentially reduced rate of power dissipation. As field effect transistors are in principle voltage-controlled components and as high capacities have to be recharged during operation, speed losses generally have to be put up with. As with the ever increasing integration tendencies it is essential that power dissipation be reduced, FET storage concepts consisting of complementary transistors (CMOS structures) have been developed (cf., e.g., *Electronics*, February 17, 1969, pp. 109–113). As in such CMOS arrangements each storage FET has to be associated with a FET of the complementary type, they entail the problem of an enlarged cell area.

Known, too, are flip flop storage arrangements with both bipolar and unipolar, i.e., field effect transistors (cf. IBM TDB Vol. 14, No. 11, April 1972, p. 3211; IBM TDB Vol. 9, No. 6, November 1966, p. 702). In these circuits cross-coupled bipolar transistors are proposed as active storage transistors, to the load branches of which one field effect transistor each is connected. These transistors are generally bipolar flip flop storage cells whose load elements, as a result of the FETs used, have a high resistivity, so that considerable reductions in power dissipation can be expected, particularly since stand-by operating current switching is provided. However, these "hybrid" storage cells, similar to bipolar storages, necessitate that the cross-coupled storage transistors be embedded in mutually isolated and thus area-consuming semiconductor regions. Although a low rate of permanent power dissipation can be impressed in the stand-by state, a considerable increase in the operating current during reading is no longer possible without difficulties. Depending upon which of these two disadvantageous characteristics (isolation requirement, low operating/stand-by current ratio) is emphasized, one would be forced to resort to non-hybrid storage concepts, i.e., storage cells or arrangements solely consisting of bipolar or field effect transistors.

SUMMARY OF THE INVENTION

It is an object of the invention to provide a storage circuit, by means of which the above requirements are optimally met, i.e., a circuit permitting the advantages of all FET storage cells to be linked with those of storage cells made up of all bipolar transistors. The storage cells to be provided are capable of being combined in the form of an extensive storage arrangement ensuring low semiconductor area requirements and thus a high packing density and which, in comparison with FET circuits, permits the level of the operating current to be raised for addressing.

In accordance with the invention, this problem is solved by the provision of a semiconductor storage cell operating on the flip flop principle and in which the cross-coupled storage transistors are field effect transistors and the load transistors are bipolar transistors. The semiconductor cell includes an FET storage cell whose active storage transistors are field effect transistors which, in contrast to bipolar storage transistors, do not have to be isolated against each other and thus occupy a smaller semiconductor area. The bipolar load transistors permit a very low stand-by current of the order of the leakage current to be impressed in a favourable manner and which, in contrast to FET load elements, can be changed to a desirably high operating current during reading. Apart from this, the bipolar transistors in the load branches need not be isolated against each other in this configuration, so that at a low rate of permanent power dissipation, which is roughly comparable to that of CMOS storages, the semiconductor cell area can be further reduced.

In accordance with an advantageous embodiment of the invention, the bit lines can be directly coupled with the storage transistors, so that additional selection transistors for reading and writing are dispensed with. In accordance with a further advantageous embodiment of the invention, it is provided that the bipolar transistors are PNP transistors whose base terminals, linked with each other, are connected to a reference voltage which is about the same potential as, or higher than, the threshold voltage of the storage transistors, and that the emitter terminals of the bipolar transistors are jointly linked with a word line.

In the stand-by state all cells on a common word line are fed with a low stand-by current, the potentials of the bit lines being maintained at about 0 volts. During reading, the selected word line receives an increased current, as a result of which an increased current is emitted from the bit line associated with the conductive transistor to recharge the bit line capacity. By sensing the current or voltage difference of the bit lines the state of the cell can be accurately determined, whereby the non-selected word lines can be suitably switched off to obtain a higher read signal. During writing, an increased current is also applied to the selected word line and, in addition, the potential of the conductive storage transistor is raised in such a manner that the latter switches off and the other storage transistor switches on.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
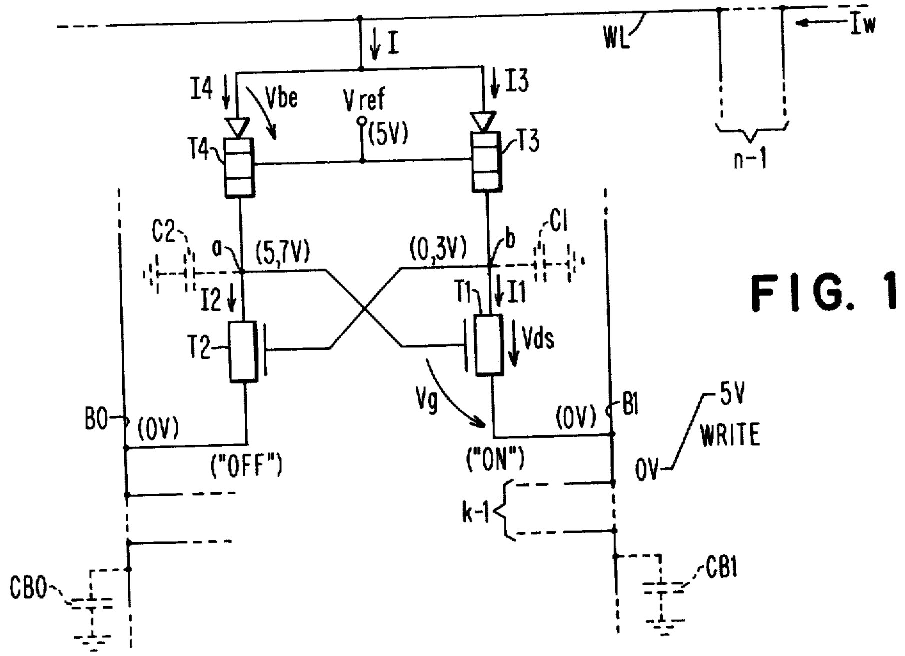
FIG. 1 is a schematic circuit diagram of the storage cell showing the interconnection of the FET and bipolar devices of the invention.

FIG. 1 is a circuit diagram of the storage cell in accordance with the invention, utilizing N-channel FETs T1 and T2 as active storage elements and bipolar PNP transistors T3 and T4 as load elements. The gate and drain terminals of storage FETs T1 and T2 are cross-coupled similar to known flip flop circuits. The load branch of the respective storage FET T1 or T2 comprises one bipolar load transistor T3 or T4 each. The collector of bipolar load transistors T3 is linked with the drain terminal of T1 via node *b*. Similarly, the collector of T4 is connected to the drain terminal of T2 via node *a*. The base and emitter terminals of bipolar load transistors T3 and T4 are coupled with each other, the base terminals being connected to a reference voltage V*ref*. The emitter terminals of T3 and T4 are connected to word line WL. Access for reading and writing the storage cell is made via bit lines B0 and B1, B0 being linked with the source terminal of T2 and B1 being connected to the source terminal of T1. In the circuit diagram of FIG. 1 at nodes *a* and *b* capacitors C2 and C1, disposed between node *a* or *b* and ground, are represented by broken lines. These capacities are normally formed by the transistor doping areas and thus need not be provided by discrete devices. Their function will be described further on in this specification.

From such storage cells extensive matrix storages can be formed which are selected or addressed via word line WL and bit lines B0 and B1. Activation of word line WL causes all storage cells of a word to be addressed. For the embodiment of FIG. 1 it is assumed that *n* storage cells can be addressed via a word line WL, i.e., parallel to the illustrated storage cell further *n*—1 storage cells are connected to the same word line, as is indicated by the *n*—1 branches from word line WL. Of the *n* storage cells of a word, a particular cell can be selected by addressing a particular bit line pair B1, B0, whereby this bit line pair B1, B0 has further branches to corresponding storage cells within another word, this being indicated by the *k*—1 branches from bit line pair B1, B0. Finally, capacities CB1 and CB0, linked with the bit lines, are represented by broken lines.

The operation of the storage cell in accordance with the invention will now be described in detail. In order to ensure that the permanent power dissipation of a storage cell is as low as possible, the storage cell(s) are operated in a non-addressed or stand-by state at a very low current which is just sufficient to maintain the respective storage state. During reading and writing a higher operating current is switched to, so that the total rate of permanent power dissipation is relatively low. This known method can also be applied to the storage cell in accordance with the invention.

In the stand-by state of the storage cell conditions are as follows. All cells of the same word receive the common current Iw on word line WL. In this case current $I$ for one cell is $I = Iw/n$, for $n$ storage cells per word. All PNP transistors are connected to the common base potential V*ref*. As with other integrated storage cells the V*be* voltages of the PNP transistors are extremely identical in relation to each other providing good "tracking," i.e.—all cells receive about the same current I. Assuming storage FET T2 is off, its drain current I2 is practically zero (or more accurately speaking it equals the leakage current I1 of node *a*) and PNP transistor T4 is highly saturated. In this assumed storage state storage FET T1 is conductive (in the linear range of its characteristic) and T3 is conductive in its active range. Assuming V*be* to be identical for T3 and T4, then the following applies:

$$I3/I4 = 1/(1 - \alpha_N \times \alpha_I)$$

where $\alpha_N$ and $\alpha_I$ are respectively the normal and inverse current amplification of T3 and T4 in common base configuration. Current I4 flows entirely over the base of T4 to Vref. The base current of T3 is I3 $(1 - \alpha_N)$ and also flows to Vref, whereas I1 $= \alpha_N \times$ I3 flows into the drain terminal of T1.

Also applicable is $$I3 + I4 = I$$

where $$I3 \doteq I/(2 - \alpha_N \times \alpha_I)$$

so that $$I/2 < I3 < I.$$

An arbitrarily low cell current I can be impressed via the word line. The minimum current I min is a function of the leakage current IL, so that $\alpha_N I4 > IL$, $\alpha_N \times I/2 > IL$, and $I > 3\ IL/\alpha_N$.

The lowest voltage potential V*ref* as related to the bit line potential is given by $$Vg - Vt > 0$$

where V*g* is the gate voltage and V*t* the threshold voltage of the storage FETs. The latter condition must be fulfilled for the storage FET to be conductive.

From the circuit of FIG. 1 there also follows that:

$$Vg = Vref + Vf$$

and thus $$Vref > Vt - Vf.$$

In this relation V*f* is the diode voltage of the collector/base diode of the respective PNP transistor. Typical values are V*t* = 1 volt and V*f* = 0.7 volt.

Proceeding from these conditions for the stand-by state, the cell current in the selected state is appropriately increased to raise the read and write speed. In this case the pronounced non-linear input characteristic of bipolar PNP transistors T3 and T4 leads to only a slight increase (by about 60 mV at an increase in the cell current I by the factor 10) in the potential of word line WL. This means that for addressing a storage cell the voltage swing of the word line is only several 100 mV, so that essentially faster low power dissipation drive circuits, not shown, can be integrated on the same semiconductor chip. As the word line normally has a substantial capacity, load elements made up of field effect transistors would entail great speed reductions because of the relatively high voltage swings required for field effect transistors. In comparison with the low voltages of several mV occurring in the circuit in accordance with the invention, field effect transistors would require voltage swings of about 5 V or higher.

For assessing the maximum current I1max of transistor T1 in the addressed state on has to proceed from the relation $$Vds < Vt$$

so that the non-conducting storage FET is not switched on. $Vds$ is the voltage between drain and source of the conducting storage FET T1, assuming that T1 is conductive and that T2 is non-conductive.

Also applicable is $$I1 = \gamma\,(W/L) \times (Vg - Vt - Vds/2) \times Vds$$

where $\gamma$ is the normalized pitch and W/L is the width/length ratio for the channel of a storage FET.

Under the conditions of:

$$Vg = Vref + Vf$$

as well as $Vds/2 << Vg - Vt$ result in:

$I1 = \gamma\,(W/L) \times (Vref + Vf - Vt) \times Vds$, i.e., $I1 < \gamma\,(W/L) \times (Vref + Vf - Vt) \times Vt$ For example, at $\gamma = 30\ \mu A/V^2$, W/L = 2, $Vt = 1$ V, $Vf = 0.7$ V and $Vref = 5$ V, it can be shown that:

$I1max < 30\ \mu A \times 2 \times (5 + 0.7 - 1) \times 1$, i.e.

$I1max < 282\ \mu A$.

Assuming, for example, 10 nA for the leakage current, the minimum cell current in the stand-by state, Imin, can be selected to be about 20 nA ($\alpha_N \approx 1$), then the current in the addressed state can be chosen to be higher by more than four orders of magnitude. This is not possible for cells with FET load elements because of the essentially reduced non-linearity of the current/voltage characteristic and because of device parameter tolerances, in particular the threshold voltage $Vt$. This leads to a considerable advantage in the case of bipolar load elements being used in accordance with the invention for the FET storage cell of FIG. 1.

Different $Vref$ potentials can be chosen for the stand-by and the addressed state, e.g., $Vref = 1.5$ for the stand-by state and $Vref = 5$ V for the addressed state. Thus, the stand-by capacity of the storage cell can be based on a lower voltage, which leads to a further improvement of the storage cell.

For reading, an increased current pulse I is impressed into the selected storage cell via the respective word line WL. The non-selected cells are preferably disconnected from the current supply, so that the current in the bit lines only originates from the selected cells of a word. Whereas the potential of the bit lines is maintained at, for example, 0 V, in the stand-by state, this reference voltage source for the bit line potential is switched off during reading, so that the cell current can charge the corresponding bit line capacity. In the case assumed above where T1 is conductive CB1 will be charged. As soon as bit line B1 has been charged by several mV, e.g., by 10–100 mV, the state of the storage cell can be determined by means of a read amplifier, not shown. To this end either the potential on one bit line or the voltage difference between both bit lines B0–B1 can be measured and evaluated. The read circuit connected to the bit lines must ensure that the voltage of the bit line is not increased too much ($VCB + Vds < Vt$) to prevent non-conducting transistor T2 from being switched on.

Reading can also be effected without disconnecting the non-selected cells from the current supply. In this case the non-selected storage cells in which the very low stand-by current is impressed contribute slightly to the resulting current in the bit lines. However, the capacity CB1 or CB0 connected to the bit lines must not be charged over a longer period of time in order to prevent the storage contents from being changed during reading. This problem is avoided by limiting the bit line voltage on the one hand and on the other by keeping the access time sufficiently short that, during reading, no substantial charging takes place as a result of the current supplied by the non-selected storage cells.

In order to write information into the cell, an increased current is applied to the selected storage cells as in reading, whereas the non-selected cells are preferably disconnected from the current supply. Again assuming that T1 is conductive and T2 is blocked, transistor T1 is turned off or made at least less conductive by a sufficiently positive voltage pulse on bit line B1, whereas the potential of bit line B0 remains at the stand-by potential of 0 V. If T1 is turned off by this bit line pulse, then the collector current of PNP load transistor T3 is capable of charging node *b*. As soon as the threshold voltage of storage FET T2 is exceeded, T2 is switched on very rapidly by the feed-back mode initiated in this case. The newly written storage state, T1 blocked and T2 conductive, is maintained if the bit line potential of B1 is reduced back to the stand-by potential after T2 has been switched on.

The non-selected storage cells cannot switch as no charge current is supplied by the load element. Capacity C1, which in most cases suffices as the internal capacity of the transistors, prevents the potential of mode *b* being raised as a result of capacitive coupling via the internal capacities of T1 and thus via the drain-source path. An additional function of the capacity C2 will be seen from the following. Through capacity C2 the potential of the gate of T1 is maintained, so that by raising the potential on bit line B1 and thus on the source terminal of T1 transistor T1 is safely switched off. Capacities C1 and C2 are represented by broken lines in FIG. 1 to show that normally they do not have to be provided especially, but are rather formed by the drain and collector capacities of the storage and load transistors.

Finally, it is also possible to change the storage cell by driving the blocked storage FET into conductivity by means of a negative bit line pulse, which in the assumed case would be applied to bit line B0.

Figure 2:
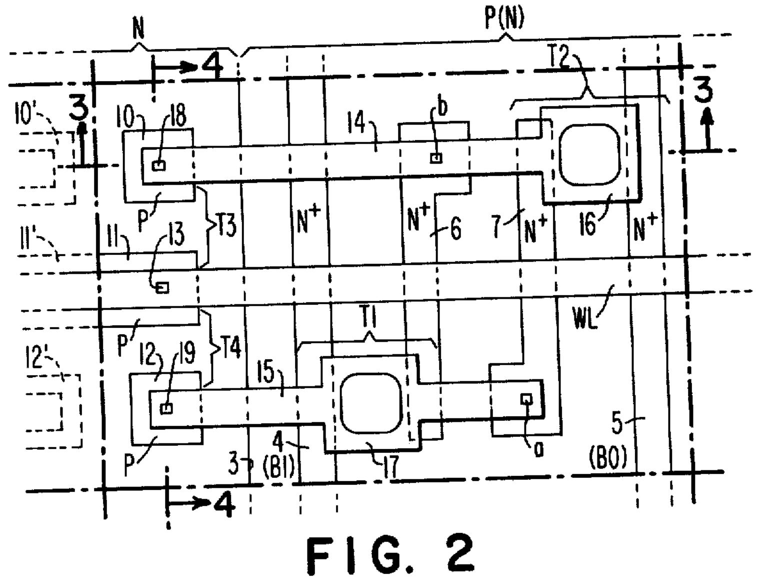
FIG. 2 is a sectional plan view of the storage cell in an integrated storage arrangement utilizing the storage cell circuit of FIG. 1.
Figure 3:
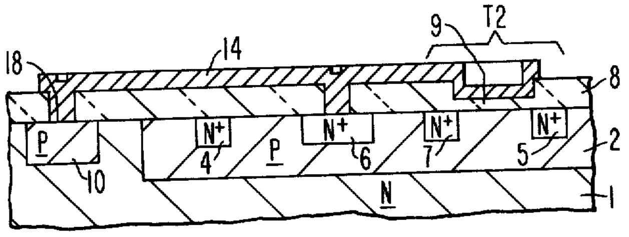
FIG. 3 is a section taken along line 3—3 in FIG. 2.
Figure 4:
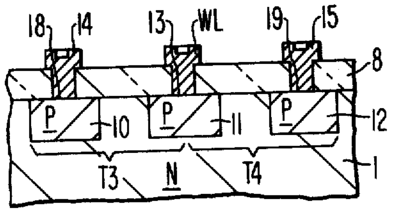
FIG. 4 is a section taken along line 4—4 in FIG. 2.

FIG. 2 is a sectional plan view of an integrated storage layout for providing a storage cell in accordance with FIG. 1. The sectional views of FIGS. 3 and 4 are used for explanation. Similar to semiconductor circuits with complementary field effect transistors, elongated P-type conductivity doping regions 2 are introduced into an N-type conductivity semiconductor substrate1 by any technique well known in the art. Whereas bipolar load transistors T3 and T4 are formed directly in substrate 1, storage FETs T2 and T1 are formed within P-type conductivity semiconductor region 2. In FIG. 2 the junction between the N- and P-type conductivity stripe-shaped areas is indicated by reference numeral 3. Although FIG. 2 merely illustrates a single storage cell, it is pointed out that all storage cells of the storage array are located adjacent to, but without being isolated against, each other. Within elongated region 2 bit lines B1 and B0 are provided as N+ doped stripes 4 and 5. These doping stripes 4 and 5 simultaneously form the source regions of storage FETs T1 and T2. The associated drain regions of storage FETs T1 and T2 are formed by providing N+ regions 6 and 7 which are spaced from areas 4 and 5. As will be seen from the cross-sectional view of FIG. 3, the semiconductor body with its doping regions is superimposed by an isolation layer 8 preferably comprising silicon dioxide and/or silicon nitride. At the points where a channel for a storage FET is to be formed, the isolation layer is designed in a known manner to be very thin, which is illustrated by the very thin isolation layer 9 for storage FET T2 in the sectional view of FIG. 3.

Contrary to storage FETs T1 and T2, bipolar load transistors T3 and T4 are provided within N-type conductivity semiconductor substrate 1. In the example shown the transistors T3 and T4 are lateral bipolar transistors which, in contrast to vertical bipolar transistors, consist of spaced (base width) adjacent doping regions for the emitter and collector areas, respectively. FIG. 4 is a section taken along line 4—4 of FIG. 2 through the bipolar load transistor structures, with semiconductor substrate 1 comprising the common base regions which are connected to reference voltage $V_{ref}$ at a point not shown. Substrate 1 includes the spaced P doped regions 10, 11 and 12. P region 10 forming the collector of T3 and P region 12 the collector of T4. The emitter area common to the two transistors T3 and T4 is represented by P doped region 11. Isolation layer 8 previously mentioned also extends across the bipolar transistor structures.

Finally, the mutual interconnection of the storage cell elements is provided by overlying conductive lines shown in FIGS. 2 to 4. The common emitter areas of all storage cells of a word are contacted via word line WL. The contact point for the illustrated storage cell is referred to as 13. Through the use of metallization stripes 14 and 15 storage FETs T1 and T2 are cross-coupled and linked with their associated load transistors T3 and T4. The same metallization, stripes 14 and 15, also forms the respective gate electrodes 16 and 17 over the thin isolation layer 9. The switching points designated as nodes *a* and *b* in FIG. 1 are formed by the contact points of metallization stripes 14 and 15 with N+ doping regions 6 and 7, respectively. Collector area 10 and 12 of bipolar load transistors T3 and T4 are contacted at points 18 and 19.

Doping regions 10', 11', 12' represented by broken lines in the left part of FIG. 2 are shown to illustrate that the storage cells of an extensive storage array are arranged in stripes adjacent to each other in such a manner that the load transistors are located in a common N stripe, emitter area 11, 11' being common to four load transistors in each case.

For the manufacture of the semiconductor circuit known methods can be used. Finally, it is pointed out that process simplification can be obtained by forming P regions 10, 11 and 12 for the bipolar transistors and P doped stripe 2 for the storage FETs simultaneously.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A low power dissipating memory cell comprising:
a pair of field effect storage transistors, each having two current conducting terminals and a gate terminal, a first one of said current conducting terminals of each field effect storage transistor being connected to the gate terminal of the other field effect storage transistor to form a bistable storage circuit;
a pair of bipolar load transistors, each having an emitter, collector and base terminal, the emitter-collector path of each of said bipolar load transistors being serially connected to said first one of said current conducting terminals of each of said pair of field effect storage transistors;
a pair of bit lines, each bit line connected to the second current conducting terminal of one of said field effect storage transistors; and
a word line commonly connected to both of said bipolar load transistors.

2. The memory cell of claim 1 further including:
means for applying a common reference potential to the base terminals of said bipolar load transistors, and wherein said word line is connected to the emitter terminals of said bipolar load transistors.

3. The memory cell of claim 2 wherein said bipolar and field effect transistors are complementary transistor types.

4. The memory cell of claim 3 wherein said bipolar load transistors are PNP type transistors.

5. The memory cell of claim 2 further including:
means for applying a low standby current to said word line when said cell is in an unselected state; and
potential supply means for maintaining said bit lines at a fixed potential during said unselected state.

6. The memory cell of claim 5 further including:
means for applying a select current to said word line when said cell is in a selected state, said select current being higher than said standby current; and
means for sensing the presence of a current difference in said bit lines representative of the state of said memory cell during said selected state.

7. The memory cell of claim 6 further including:
write means for selectively changing the potential of at least one of said bit lines during said selected state to cause said cell to assume one of two bistable conditions.

8. The memory cell of claim 7 wherein the capacitive voltage nodes at the first one of said current conducting terminals of said field effect storage transistors has sufficient capacity to fix the gate potential of the field effect storage transistor to be turned off during writing for the duration of the switching time of said field effect storage transistor to be turned off.

9. The memory cell of claim 2 including:
means for changing said common reference potential applied to the base terminals of said bipolar load transistors during said selected state.

10. A low standby power dissipating memory array comprising:

a plurality of memory cells arranged to form a matrix of rows and columns, each cell comprising a pair of cross-coupled field effect transistors, one current conducting electrode of each field effect transistor being connected to the gate electrode of the other form a bistable circuit, each of said cells further including a pair of bipolar load transistors associated with each field effect transistor, and having its collector connected to said one current conducting electrode;

a plurality of word lines, each word line commonly connected to the emitters of each of said bipolar load transistors in each memory cell in the same row;

a plurality of first bit lines, each first bit line commonly connected to the other of the current conducting electrodes of one of said field effect transistors in each cell in the same column;

a plurality of second bit lines, each second bit line commonly connected to the other current conducting electrode of the other field effect transistor in each cell in the same column;

reference potential means for applying a reference potential to the base of each bipolar load transistor; and control signal means for selectively providing control signals to said word and bit lines to provide reading, writing and sensing of at least one of said memory cells.

11. The memory array of claim 10 wherein said control signal means comprises means for applying a low standby current to said word lines during an unselected state and for selectively providing a higher select current to at least one of said word lines during a selected state.

12. The memory array of claim 11 further including: means for sustaining said bit lines at a fixed potential during said unselected state.

13. An integrated semiconductor structure comprising:

a substrate of one type conductivity;

an isolation region of opposite type conductivity extending from one surface of said substrate;

first regions of said one type conductivity extending from said one surface of said substrate and enclosed within said isolation region to form the drain regions of a first and second storage field effect transistor;

second regions of said one type conductivity extending from said one surface of said substrate and enclosed within said isolation region to form the source regions of said first and second storage field effect transistors;

first regions of opposite type conductivity extending from said one surface of said substrate outside of said isolation region to form the emitter region of a first and second bipolar load transistor;

second regions of said opposite type conductivity extending from said one surface of said substrate outside of said isolation region to form the collector regions of said first and second bipolar load transistors;

first conductive means forming a gate electrode for said first storage field effect transistor and for interconnecting the drain region of said second storage field effect transistor and the collector region of one of said bipolar load transistors;

second conductive means forming a gate electrode for said second storage field effect transistor and for interconnecting the drain region of said first storage field effect transistor and the collector region of the other of said bipolar load transistors; and means for applying signals to the source regions of said storage field effect transistors, said substrate and said emitter region to enable said structure to operate as a storage cell.

14. The integrated semiconductor structure of claim 13 wherein:

said first regions of said one type conductivity extend laterally and are common to a plurality of substantially identical storage cell.

15. The integrated semiconductor structure of claim 14 wherein said regions of opposite type conductivity are formed simultaneously.

16. The integrated semiconductor structure of claim 13 wherein said substrate is N-type conductivity.

* * * * *